(12) United States Patent
Shome et al.

(10) Patent No.: US 9,581,146 B2
(45) Date of Patent: Feb. 28, 2017

(54) SMART SUSCEPTOR FOR A SHAPE MEMORY ALLOY (SMA) ACTUATOR INDUCTIVE HEATING SYSTEM

(71) Applicant: The Boeing Company, Chicago, IL (US)

(72) Inventors: Moushumi Shome, Kent, WA (US); Frederick T. Calkins, Renton, WA (US); Stephen R. Amorosi, Seattle, WA (US); Flint M. Jamison, Lynnwood, WA (US); Sahrudine Apdalhaliem, Seattle, WA (US); Robert James Miller, Fall City, WA (US)

(73) Assignee: The Boeing Company, Chicago, IL (US)

( * ) Notice: Subject to any disclaimer, the term of this patent is extended or adjusted under 35 U.S.C. 154(b) by 688 days.

(21) Appl. No.: 14/045,121

(22) Filed: Oct. 3, 2013

(65) Prior Publication Data
US 2015/0096293 A1 Apr. 9, 2015

(51) Int. Cl.
*H01F 41/02* (2006.01)
*F03G 7/06* (2006.01)

(52) U.S. Cl.
CPC ............. *F03G 7/065* (2013.01); *H01F 41/02* (2013.01); *Y10T 29/4902* (2015.01)

(58) Field of Classification Search
CPC F03G 7/06; F03G 7/065; H02N 10/00; H01L 37/04
USPC .............................. 60/527–529; 310/306, 307
See application file for complete search history.

(56) References Cited

U.S. PATENT DOCUMENTS

| 4,984,542 A | 1/1991 | Rische et al. |
| 8,356,792 B2 | 1/2013 | Grimseth et al. |
| 2005/0259713 A1* | 11/2005 | Tenzek ............... H05B 6/24 373/151 |

(Continued)

FOREIGN PATENT DOCUMENTS

JP 2001-099206 4/2001

(Continued)

OTHER PUBLICATIONS

International Search Report and Written Opinion of the International Searching Authority; Application No. PCT/US2014/043589; Mar. 3, 2015; European Patent Office; Rijswijk, Netherlands.

(Continued)

*Primary Examiner* — Thomas Denion
*Assistant Examiner* — Mickey France
(74) *Attorney, Agent, or Firm* — Thompson Hine LLP (57) ABSTRACT

A system for heating a shape memory alloy (SMA) actuator may include an SMA actuator, a smart susceptor, a plurality of induction coils, and a control module. The SMA actuator may have at least one layup. The SMA actuator may be selectively heated to a transition temperature. The smart susceptor may be in thermal contact with the at least one layup of the SMA actuator. The induction heating coils may be configured to receive an alternating current and generate a magnetic field based on the alternating current. The magnetic field may create an eddy current in at least one of the SMA actuator and the smart susceptor to heat the SMA actuator to the transition temperature. The control module may be configured to drive the alternating current supplied to the induction heating coils.

18 Claims, 5 Drawing Sheets

(56) References Cited

U.S. PATENT DOCUMENTS

| | | | | |
|---|---|---|---|---|
| 2006/0000211 | A1* | 1/2006 | Webster | F02K 1/383 60/527 |
| 2008/0120911 | A1* | 5/2008 | Browne | E05B 47/0009 49/352 |
| 2008/0264330 | A1* | 10/2008 | Wilkes | B01J 8/0015 117/3 |
| 2011/0173970 | A1 | 7/2011 | Torres-Jara et al. | |
| 2012/0060491 | A1* | 3/2012 | Gunter | F03G 7/065 60/527 |

OTHER PUBLICATIONS

Hartl, D.J. et al., "Characterization and 3-D Modeling of Ni60Ti SMA for Actuation of a Variable Geometry Jet Engine Chevron," Proc. of SPIE vol. 6529, pp. 65293Z-1 through 65293Z-12 (2007).
Hartl, D.J. et al., "Experimentally Validated Numerical Analysis of Aerostructures Incorporating Shape Memory Alloys," Proc. of SPIE vol. 6929, pp. 692913-1 through 692913-11 (2008).
Yu, J., "Pioneer New Technologies," Boeing EnviroBlog, http://environment.blog.boeing.com/ (Sep. 23, 2008).

\* cited by examiner

SMART SUSCEPTOR FOR A SHAPE MEMORY ALLOY (SMA) ACTUATOR INDUCTIVE HEATING SYSTEM

FIELD

The disclosed system and method relate to heating a shape memory alloy (SMA) actuator and, more particularly, to systems and methods for heating a SMA actuator with a smart susceptor.

BACKGROUND

Shape memory alloys may be used to form an actuator that has unique thermal and mechanical properties. These types of actuators may be referred to as shape memory alloy (SMA) actuators. For example, if a shape memory alloy is plastically deformed while in a martensitic state and then heated to a phase transition temperature to reach an austenitic state, the shape memory alloy morphs back to its original, non-deformed shape. The rate of return to the original, non-deformed shape depends upon the amount and rate of thermal energy applied to the shape memory alloy.

SMA actuators may be activated by heating the shape memory alloy to its phase transition temperature, which causes the shape memory alloy to undergo a phase transformation from the martensitic to the austenitic state and morph back to its original, non-deformed shape. SMA actuators may be used in variety of applications such as, for example, an airfoil system for an aircraft. However, SMA actuators have, in at least some instances, proved challenging to control. For example, an SMA actuator may be activated by a resistance heating element. One drawback to this approach is that the resistance heating element may not heat the shape memory alloy of the SMA actuator quickly enough to its phase transition temperature. Accordingly, there exists a need in the art for improved techniques for controlling SMA actuators.

SUMMARY

In one embodiment, a system for heating a shape memory alloy (SMA) actuator may include an SMA actuator, a smart susceptor, a plurality of induction coils, and a control module. The SMA actuator may have at least one layup. The SMA actuator may be selectively heated to a transition temperature. The smart susceptor may be in thermal contact with at least one layup of the SMA actuator. The induction heating coils may be configured to receive an alternating current and generate a magnetic field based on the alternating current. The magnetic field may induce an eddy current in at least one of the SMA actuator and the smart susceptor to heat the SMA actuator to the transition temperature. The control module may be configured to drive the alternating current supplied to the induction heating coils.

In another embodiment, a system for heating a SMA actuator may include an SMA actuator, a smart susceptor, a plurality of induction coils, and a control module. The SMA actuator may be selectively heated to a transition temperature. The induction heating coils may be configured to receive an alternating current and generate a magnetic field based on the alternating current. The magnetic field may induce an eddy current in at least the SMA actuator and a secondary magnetic field in the smart susceptor. The smart susceptor may be positioned relative to the SMA actuator such that the secondary magnetic field induces an additional eddy current within the SMA actuator. The control module may be configured to drive the alternating current supplied to the induction heating coils.

In yet another embodiment, a method of manufacturing a shape memory alloy inductive heating system may include providing a shape memory alloy (SMA) actuator. The SMA actuator may have at least one layup. The method may include placing a smart susceptor in thermal contact with the at least one layup of the SMA actuator. The method may also include providing a plurality of induction heating coils configured to receive an alternating current and generate a magnetic field based on the alternating current. The magnetic field may create an eddy current in at least one of the SMA actuator and the smart susceptor to heat the SMA actuator to a transition temperature. The method may include providing a control module configured to drive the alternating current supplied to the induction heating coils.

Other objects and advantages of the disclosed method and system will be apparent from the following description, the accompanying drawings and the appended claims.

DETAILED DESCRIPTION

Figure 1:
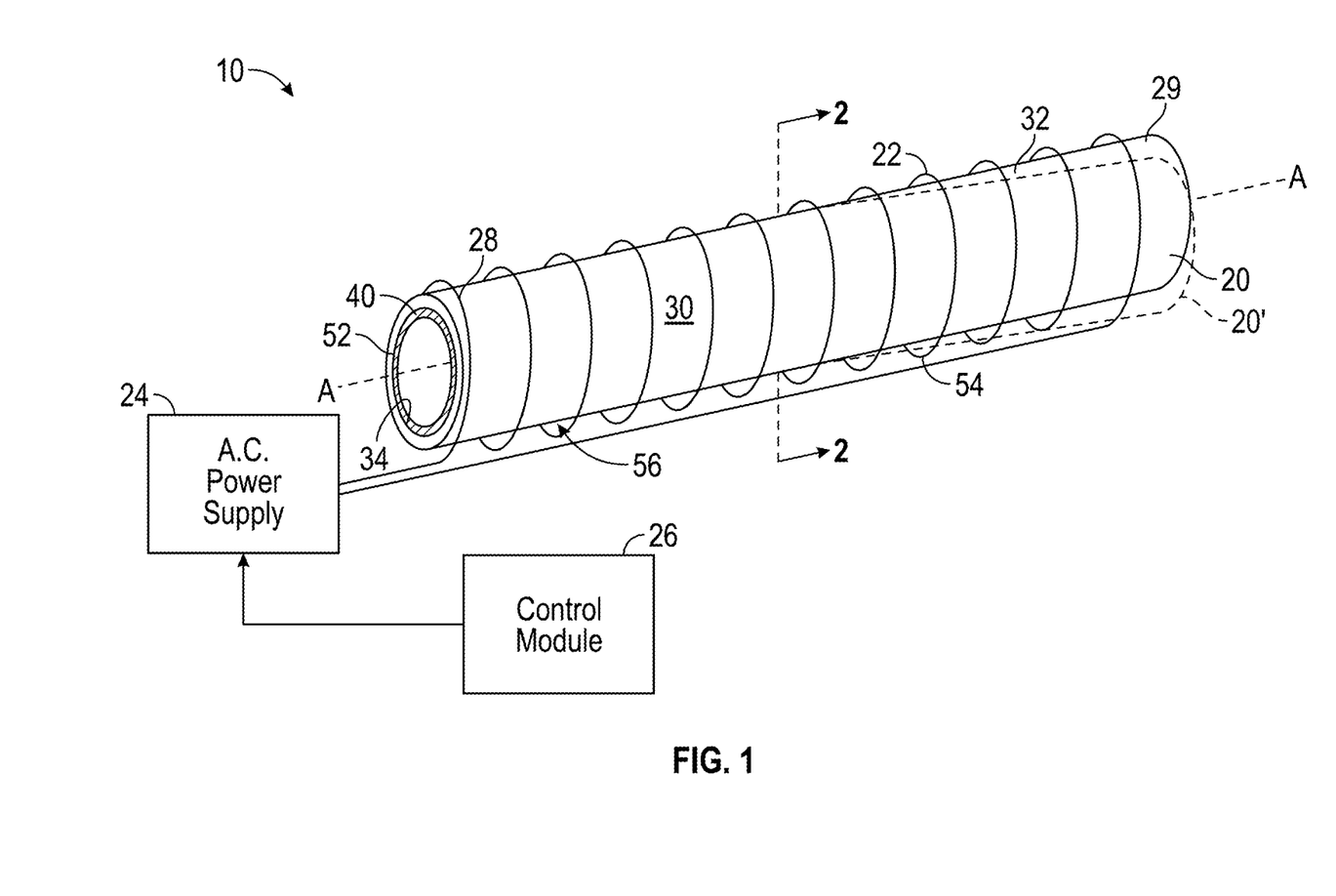
FIG. 1 is a schematic view of the disclosed shape memory alloy inductive heating system.

As shown in FIG. 1, the shape memory alloy inductive heating system, generally designated 10, may comprise a shape memory alloy (SMA) actuator 20, an induction heating coil 22, a power supply 24, and a control module 26. Alternating electric current may be supplied to the coil 22 by the power supply 24 to inductively heat the SMA actuator 20. The shape memory alloy inductive heating system 10 may be used in a variety of applications such as, for example, an aircraft, power systems, oil drills equipment, rotor craft, and automotive components. Specifically, the shape memory alloy inductive heating system 10 may be used for actuating a wing or door of an aircraft, a blade of a wind turbine, or an air pressure latch located in a trunk of a vehicle. It is to be understood that these are merely illustrative examples, and the shape memory alloy inductive heating system 10 may be used other applications as well.

The SMA actuator 20 may be constructed of a shape memory alloy (also known smart metal, memory metal, memory alloy, and smart alloy). For example, in one embodiment, the shape memory alloy may be a nickel-titanium alloy or a copper-aluminum-nickel alloy. Additionally, the shape memory alloy may be created by alloying zinc, copper, gold and iron. The SMA actuator 20 may be activated by heating the shape memory alloy to a transition temperature, which may cause the shape memory alloy to undergo a phase transformation from a martensitic to an austenitic state, which may induce a shape change in the SMA actuator 20. Specifically, for example, a first end 28 of the SMA actuator 20 may be held stationary, and a second end 29 of the SMA actuator 20 may twist or deform and morph to the contour of SMA actuator 20' when the shape memory alloy is heated to its transition temperature. Likewise, the second end 29 of the SMA actuator 20 may resume its non-morphed state once the shape memory alloy is cooled below its transition temperature.

Figure 4A:
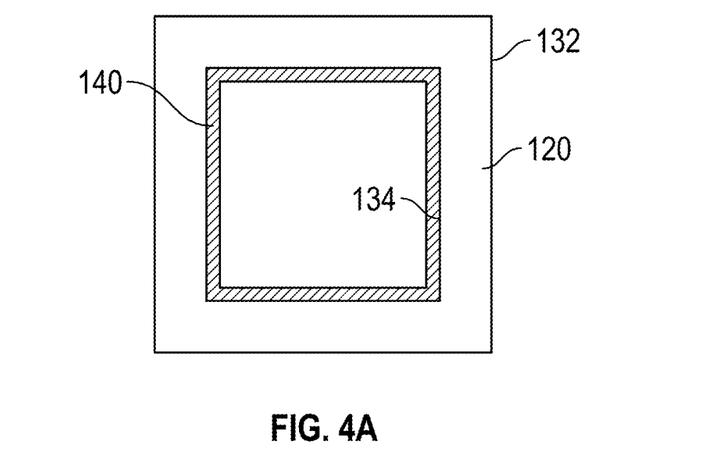
FIG. 4A is a cross-sectional view of an alternative embodiment of the SMA actuator shown in FIG. 1.
Figure 4B:
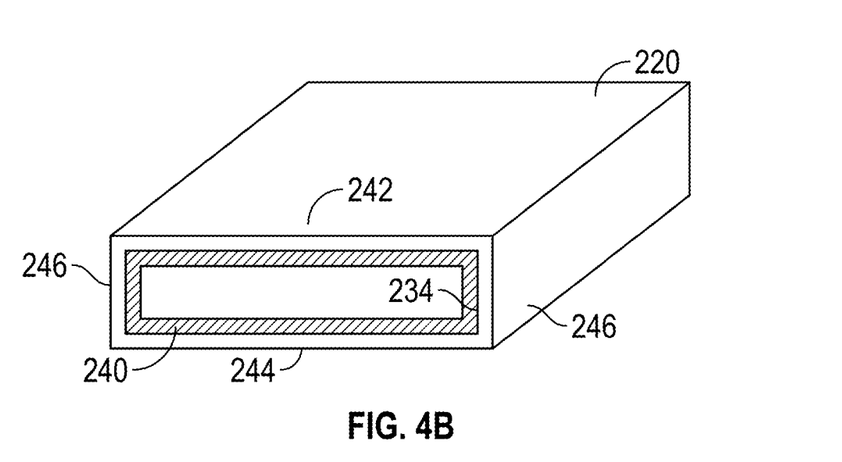
FIG. 4B is a perspective view of another embodiment of the SMA actuator shown in FIG. 1.
Figure 4C:
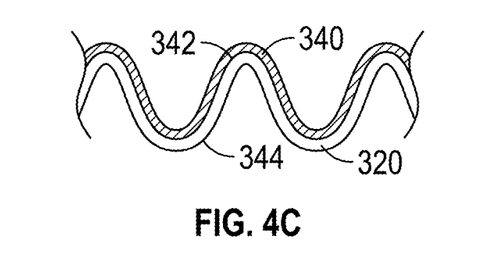
FIG. 4C is a cross-sectional view of yet another embodiment of the SMA actuator shown in FIG. 1.

In the exemplary embodiment as shown in FIG. 1, the SMA actuator 20 may include an elongated, generally tubular body 30 that extends along an axis A-A. Although FIG. 1 illustrates the SMA actuator 20 having a generally tubular body, it is to be understood that the SMA actuator 20 may be shaped in a variety of different configurations. For example, FIGS. 4A-4C illustrate various alternative embodiments of the SMA actuator 20, which are discussed in greater detail below. The body 30 of the SMA actuator 20 may include an outer layup 32 and an inner layup 34. A layup may be defined as one layer or ply of the body 30 of the SMA actuator 20. A smart susceptor 40 may be located along the inner layup 34 of the SMA actuator 20. In the illustrated embodiment, the smart susceptor 40 may be in a sheet form, where a series of relatively thin wires constructed of the smart susceptor material are embedded within the sheet (the wires are not visible in FIG. 1). An outer layup 52 of the smart susceptor 40 may thermally contact the inner layup 34 of the SMA actuator 20. Although FIG. 1 illustrates the smart susceptor 40 in sheet form, it is to be understood that the smart susceptor 40 may include a variety of different configurations. For example, in an alternative embodiment, the smart susceptor 40 may be a series of wires received in grooves (not illustrated) located along the inner layup 34 of the SMA actuator 20.

The smart susceptor 40 may be inductively heated until reaching its Curie point or Curie temperature. The Curie temperature depends on the specific material of the smart susceptor 40. For example, in one non-limiting embodiment, the smart susceptor 40 may be constructed of a nickel-iron alloy having a nickel content of about 34%, an iron content of about 66%, and a Curie temperature of about 138° C. (280° F.), however it is to be understood that the smart susceptor 40 may be other types of alloys as well. The smart susceptor 40 may only be inductively heated up to, but not beyond, its Curie temperature. Once the smart susceptor 40 reaches the Curie temperature, the magnetic permeability of the smart susceptor 40 drops precipitously, and the smart susceptor 40 may become substantially non-magnetic.

The coil 22 may be disposed at an effective distance D (shown in FIG. 2) from the outer layup 32 of the SMA actuator 20. Alternating electric current may be supplied to the coil 22 by the power supply 24. The control module 26 may be in signal communication with the power supply 24 to control or drive the supply of alternating current to the coil 22. The frequency of the alternating current may be any value from about 10 kHz to about 500 kHz. In the embodiment as shown in FIG. 1, the coil 22 may be a solenoid-type induction heating coil including an elongated, generally cylindrical body having a plurality of individual turns 54 that create a tunnel or passageway 56 for receiving the SMA actuator 20. The SMA actuator 20 may be positioned within the passageway 56 of the coil 22. Although FIG. 1 illustrates the coil 22 as a solenoid-type induction heating coil, it is to be understood that other types of induction heating coils may be used as well. For example, in one embodiment the SMA actuator 20 may be a plate-type actuator (shown in FIG. 4B) where a pancake-type induction heating coil may be used.

Figure 2:
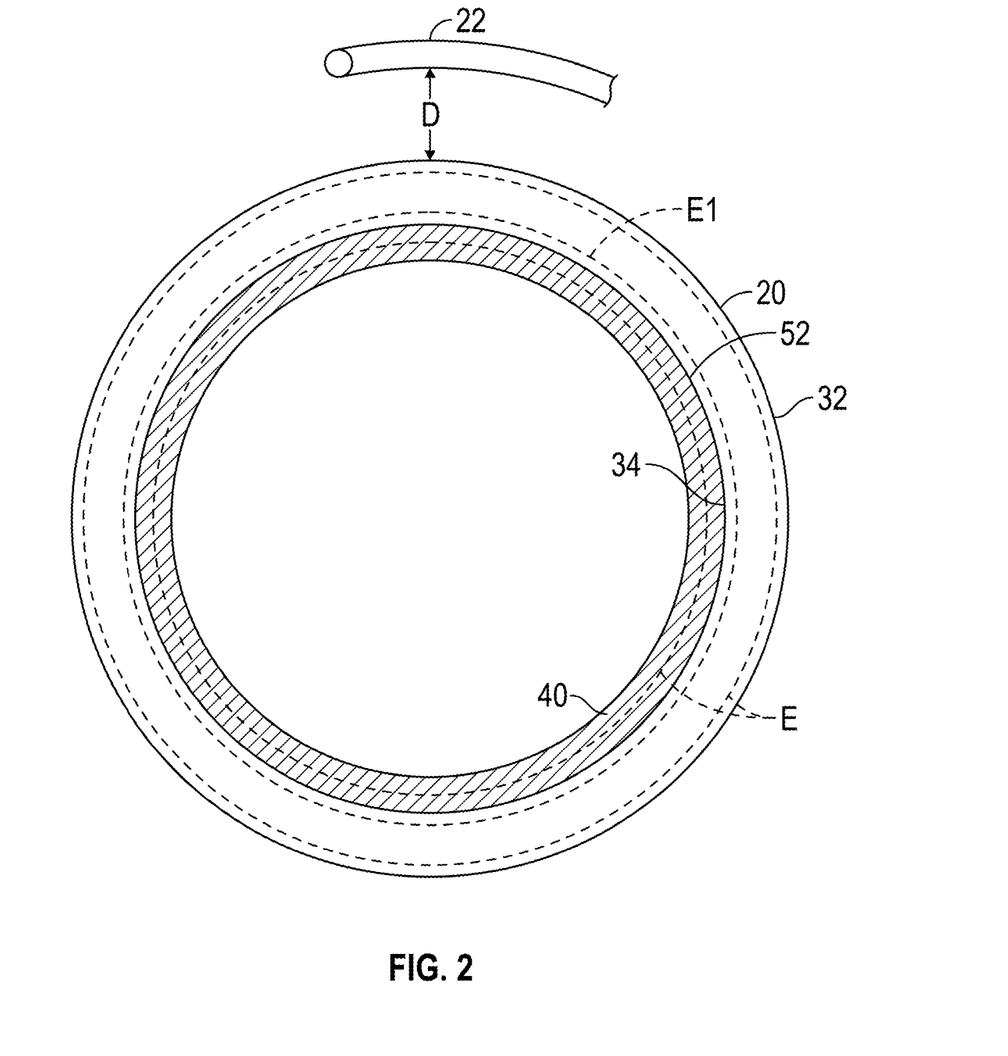
FIG. 2 is a cross-sectional view of a shape memory alloy (SMA) actuator taken along line 2-2 in FIG. 1.
Figure 3:
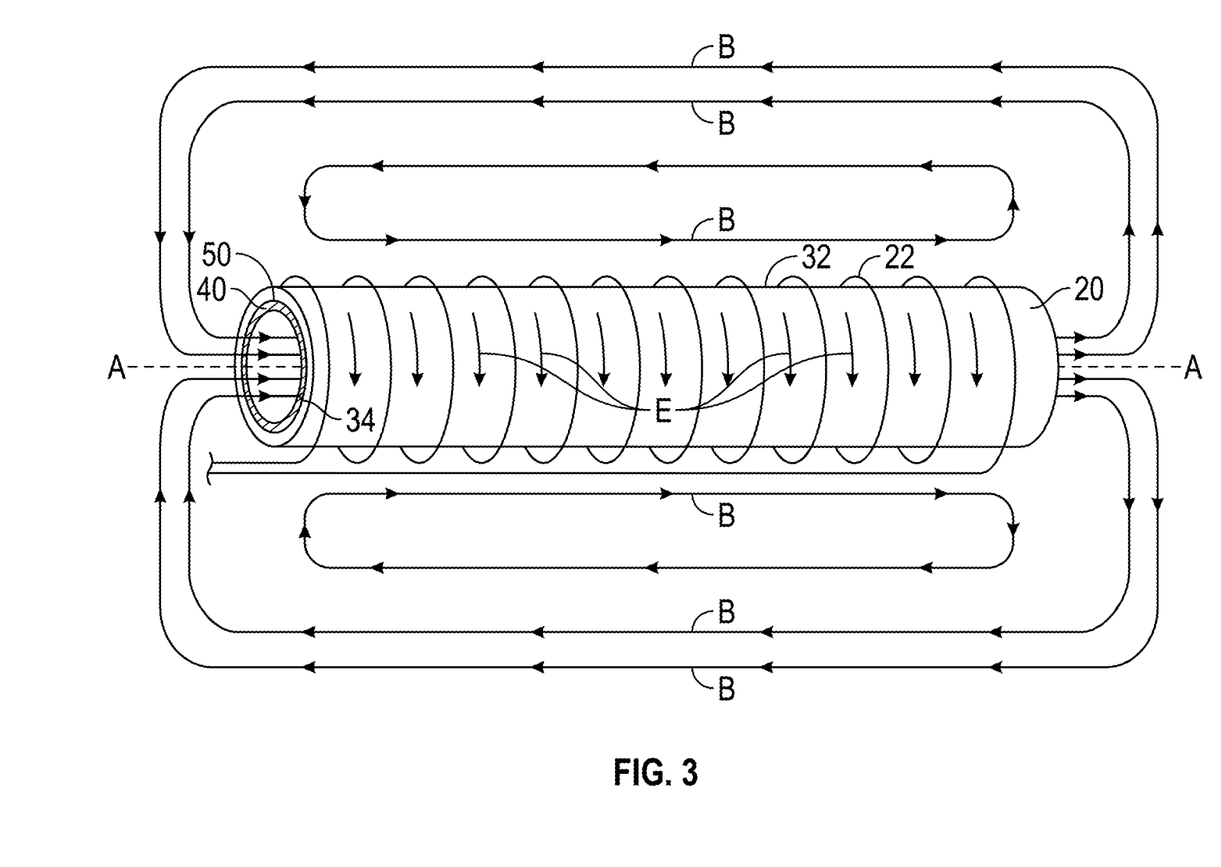
FIG. 3 is a schematic view of the SMA actuator and an inductive coil shown in FIG. 1, illustrating a magnetic field and an eddy current.

Referring to FIG. 3, the coils 22 may generate a magnetic field B based on the alternating current, where the magnetic field B may be generally parallel with respect to the axis A-A of the SMA actuator 20. The magnetic field B induces an eddy current E within the SMA actuator 20. The eddy current E generates heat within the SMA actuator 20. Referring to both FIGS. 2-3, the magnetic field B may also induce the eddy current E within the smart susceptor 40 as well, as long as the smart susceptor 40 has not reached its Curie temperature. The eddy currents E generate heat within the smart susceptor 40.

The thermal contact between the SMA actuator 20 and the smart susceptor 40 may accelerate the rate at which the SMA actuator 20 inductively heats to the transition temperature. Specifically, the smart susceptor 40 may accelerate heating of the SMA actuator 20 based on the thermal contact between the outer layup 52 of the smart susceptor 40 and the inner layup 34 of the SMA actuator 20. When alternating electric current is supplied to the coils 22 by the power supply 24, the eddy current E may be induced within the smart susceptor 40. The eddy current E generates heat within the smart susceptor 40. The heat generated by the eddy current E within the smart susceptor 40 may be transferred conductively to the SMA actuator 20 through the thermal contact between the outer layup 52 of the smart susceptor 40 and the inner layup 34 of the SMA actuator 20. The thermal contact between the SMA actuator 20 and the smart susceptor 40 may be of increased importance in an embodiment where the SMA actuator 20 is constructed of a non-conducting material. In this embodiment, the eddy current may not be induced within the SMA actuator 20 by the magnetic field B, thus heat may not be generated within the SMA actuator 20. Thus, the only source of heat to the SMA actuator 20 is the thermal contact between the SMA actuator 20 and the smart susceptor 40.

The smart susceptor 40 may increase the amount of eddy current E induced within the SMA actuator 20, which also accelerates the rate at which the SMA actuator 20 inductively heats to the transition temperature. Specifically, when alternating electric current is supplied to the coils 22, the magnetic field B induces a secondary magnetic field (not shown) within the smart susceptor 40, as long as the smart susceptor 40 remains below the Curie temperature. Referring to FIG. 2, the smart susceptor 40 may be positioned relative to the SMA actuator 20 such that the secondary magnetic field induced in the smart susceptor 40 induces an additional eddy current E1 within the SMA actuator 20. The additional eddy current E1 generates additional heat within the SMA actuator 20, thus increasing the rate at which the SMA actuator 20 inductively heats to the transition temperature.

In one embodiment, the smart susceptor 40 may be positioned relative to the SMA actuator 20 in order to maximize the amount of eddy current induced within the SMA actuator 20. For example, if the SMA actuator 20 includes the generally tubular body 30 as shown in FIGS. 1-3, then the smart susceptor 40 may be positioned around the inner layup 34 of the body 30 in order to induce the maximum amount of eddy current E within the smart susceptor 40.

Referring to FIG. 1, the control module 26 drives the power supply 24 such that alternating electric current is supplied to the coil 22 for a predetermined time interval. The predetermined time interval may represent the amount of time needed to heat the SMA actuator 20 to at least the transition temperature. The predetermined time interval may depend on variables such as, but not limited to, the use requirements of the SMA actuator 20, the type of alloy of the smart susceptor 40 is constructed of, the amount of current supplied to the coil 22, the frequency of the current supplied to the coil 22, the geometry or shape of the SMA actuator 20, any forces the SMA actuator 20 has to overcome before being able to deflect, and the amount of deflection the SMA actuator 20 undergoes. The control module 26 may drive the power supply 24 using feed-forward control where the control module 26 may not monitor the temperature of the SMA actuator 20 or the smart susceptor 40.

Once current has been supplied to the coil 22 for the predetermined time interval, the control module 26 may then send a control signal to deactivate the power supply 24. Once current ceases to be supplied to the coil 22, inductive heating to the SMA actuator 20 may stop. Thus, there is generally no thermal lag in the shape memory alloy inductive heating system 10, and the SMA actuator 20 may not be overheated.

In one embodiment, the SMA actuator 20 and the smart susceptor 40 may be thermally tied to one another, where the Curie temperature of the smart susceptor 40 may be about equal to the transition temperature of the SMA actuator 20. Thus, if the SMA actuator 20 reaches the transition temperature, the smart susceptor 40 has also reached its Curie temperature, and the smart susceptor 40 stops heating. Therefore, the smart susceptor 40 may not overheat the SMA actuator 20.

The control module 26 may also adjust the amount of current that the power supply 24 supplies to the coil 22. Varying the amount of current to the coil 22 may also vary the amount of time needed to heat the SMA actuator 20 to the transition temperature (i.e., the predetermined time interval). For example, in one embodiment, it may take about sixty seconds to heat the SMA actuator 20 from about 32° C. (90° F.) to about 99° C. (210° F.) based on a current of about 18 Amps being supplied to the coil 22. In this embodiment, the coil 22 has a coil length of about 10 centimeters (4 inches). In contrast, it may take the same coil 22 about thirty seconds to heat based on a current of about 25 Amps being supplied to the coil 22, fifteen seconds to heat based on a current of about 39 Amps being supplied to the coil 22, and about ten seconds to heat based on a current of about 50 Amps being supplied to the coil 22.

FIGS. 4A-4C illustrate alternative embodiments of the SMA actuator 20. FIG. 4A is an illustration of an SMA actuator 120 having a generally square or rectangular cross-section. The SMA actuator 120 includes an outer layup 132 and an inner layup 134, where a smart susceptor 140 may thermally contact the inner layup 134 of the SMA actuator 120. FIG. 4B illustrates another embodiment of an SMA actuator 220. The SMA actuator 220 may be a plate-type actuator having an upper wall 242, a lower wall 244, and two side walls 246. A smart susceptor 240 may be in thermal contact with an inner layup 234 of the SMA actuator 220. A pancake-type inductive coil (not illustrated) may be positioned above the upper wall 242, and another pancake-type inductive coil (not illustrated) may be positioned below the lower wall 244 to inductively heat the SMA actuator 220. In yet another embodiment as shown in FIG. 4C, the SMA actuator 320 may have a generally sinusoidal configuration. A smart susceptor 340 may be located along an upper layup 342 of the SMA actuator 320. A pancake-type inductive coil (not illustrated) may be positioned below a lower layup 344 of the SMA actuator 320 to inductively heat the SMA actuator 320.

Figure 5:
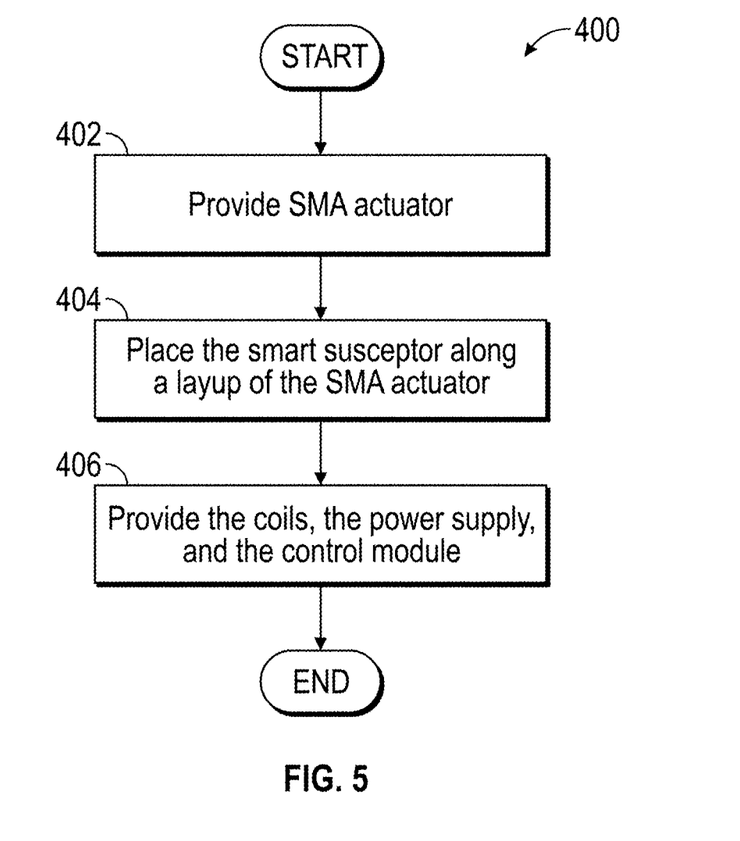
FIG. 5 is a process flow diagram illustrating an exemplary approach of manufacturing the shape memory alloy inductive heating system.

A method of manufacturing the shape memory alloy inductive heating system 10 will now be discussed. FIG. 5 is an exemplary process flow diagram illustrating a method 400 of manufacturing the shape memory alloy inductive heating system 10. Referring generally to FIGS. 1-3 and 5, method 400 may begin at block 402, where the SMA actuator 20 may be provided. Method 400 may then proceed to block 404. In block 404, the smart susceptor 40 may be placed along a layup of the SMA actuator 20. Referring specifically to FIG. 1, in one embodiment the inner layup 34 of the SMA actuator 20 may be in thermal contact with the outer layup 52 of the smart susceptor 40. Method 400 may then proceed to block 406. In block 406, the coil 22, the power supply 24, and the control module 26 may be provided, where alternating electric current may be supplied to the coil 22 by the power supply 24 to inductively heat the SMA actuator 20. The control module 26 may be in signal communication with the power supply 24 to drive the supply of alternating current to the coil 22. The coils 22 may be disposed at the effective distance D (shown in FIG. 2) from the outer layup 32 of the SMA actuator 20. Method 400 may then terminate.

Referring generally to FIGS. 1-4C, the disclosed shape memory alloy inductive heating system as described above provides a relatively simple approach to inductively heat the SMA actuator relatively quickly. The smart susceptor may heat the SMA actuator in a generally uniform fashion, regardless of non-uniformities in the shape memory alloy of the SMA actuator and the size of the SMA actuator. The smart susceptor accelerates the rate at which the SMA actuator may be heated, thus a relatively large SMA actuator having a volume of at least about 0.81 cubic centimeters (0.05 cubic inches) may be used. Moreover, because the smart susceptor may only be heated up to its Curie temperature, this generally prevents overheating of the SMA actuator 20. Some types of heating systems currently available utilize resistance heating elements to heat an SMA actuator to the transition temperature. However, resistance heating elements may not heat the shape memory alloy of the SMA actuator quickly enough. In contrast, the disclosed smart susceptors may increase the rate at which the SMA actuators may be inductively heated to the transition temperature when compared to heating the SMA actuator with a conventional resistance heating element.

While the forms of apparatus and methods herein described constitute preferred embodiments of this invention, it is to be understood that the invention is not limited to these precise forms of apparatus and methods, and the changes may be made therein without departing from the scope of the invention.

What is claimed is:

1. A system for heating a shape memory alloy (SMA) actuator, the system comprising:
   an SMA actuator having at least one layer, the SMA actuator selectively heated to a transition temperature;
   a smart susceptor in thermal contact with the at least one layer of the SMA actuator;
   a plurality of induction heating coils receiving an alternating current and generating a magnetic field based on the alternating current, the magnetic field creating an eddy current in the smart susceptor to heat the smart susceptor to a Curie temperature that is equal to the transition temperature, wherein heating the smart susceptor to the Curie temperature heats the SMA actuator to the transition temperature; and an electric circuit to drive the alternating current supplied to the induction heating coils.

2. The system of claim 1, wherein the SMA actuator includes a generally tubular body having an inner layer and an outer layer.

3. The system of claim 2, wherein the smart susceptor is in thermal contact with the inner layer of the SMA actuator.

4. The system of claim 1, wherein the magnetic field induces a secondary magnetic field in the smart susceptor, and wherein the smart susceptor is positioned relative to the SMA actuator such that the secondary magnetic field induces an additional eddy current within the SMA actuator.

5. The system of claim 1, wherein the induction heating coils include a generally cylindrical body having a plurality of individual turns that create a passageway, and wherein the SMA actuator is positioned within the passageway of the induction heating coils.

6. The system of claim 1, further comprising a current supply for supplying the alternating current to the induction heating coils, wherein the electric circuit is in signal communication with the current supply.

7. The system of claim 1, wherein the alternating current is supplied to the induction heating coils for a predetermined time interval to heat the SMA actuator to the transition temperature.

8. The system of claim 7, wherein the predetermined time interval is dependent on at least one of the group consisting of: a use requirement of the SMA actuator, a type of alloy of the smart susceptor is constructed of, an amount of current supplied to the induction heating coil, a frequency of the alternating current, a geometry of the SMA actuator, forces the SMA actuator overcomes before deflecting, and an amount of deflection of the SMA actuator.

9. A system for heating a shape memory alloy (SMA) actuator, the system comprising:
   an SMA actuator selectively heated to a transition temperature;
   a smart susceptor;
   a plurality of induction heating coils receiving an alternating current and generating a magnetic field based on the alternating current, the magnetic field inducing an eddy current in at least the SMA actuator and a secondary magnetic field in the smart susceptor, and wherein the smart susceptor is positioned relative to the SMA actuator such that the secondary magnetic field induces an additional eddy current within the SMA actuator, wherein the smart susceptor is selectively heated to a Curie temperature that is equal to the transition temperature and heating the smart susceptor to the Curie temperature heats the SMA actuator to the transition temperature; and
   an electric circuit to drive the alternating current supplied to the induction heating coils.

10. The system of claim 9, wherein the smart susceptor is in thermal contact with at least one layer of the SMA actuator.

11. The system of claim 9, wherein the SMA actuator includes a generally tubular body having an inner layer and an outer layer.

12. The system of claim 11, wherein the smart susceptor is in thermal contact with the inner layer of the SMA actuator.

13. The system of claim 9, further comprising a current supply for supplying the alternating current to the induction heating coils, wherein the electric circuit is in signal communication with the current supply.

14. The system of claim 9, wherein the alternating current is supplied to the induction heating coils for a predetermined time interval to heat the SMA actuator to the transition temperature.

15. The system of claim 14, wherein the predetermined time interval is dependent on at least one of the group consisting of: a use requirement of the SMA actuator, a type of alloy that the smart susceptor is constructed of, an amount of current supplied to the induction heating coil, a frequency of the alternating current, a geometry of the SMA actuator, forces the SMA actuator overcomes before deflecting, and an amount of deflection of the SMA actuator.

16. A method of manufacturing a shape memory alloy inductive heating system, the method comprising:
   providing a shape memory alloy (SMA) actuator, the SMA actuator having at least one layer;
   placing a smart susceptor in thermal contact with the at least one layer of the SMA actuator;
   providing a plurality of induction heating coils receiving an alternating current and generating a magnetic field based on the alternating current, the magnetic field creating an eddy current the smart susceptor to heat the smart susceptor to a Curie temperature that is equal to the transition temperature, wherein heating the smart susceptor to the Curie temperature heats SMA actuator to a transition temperature; and
   providing an electric circuit to drive the alternating current supplied to the induction heating coils.

17. The method of claim 16, further comprising providing a current supply for supplying the alternating current to the induction heating coils, wherein the electric circuit is in signal communication with the current supply.

18. The method of claim 16, wherein the SMA actuator includes a generally tubular body having an inner layer and an outer layer, and wherein the smart susceptor is in thermal contact with the inner layer of the SMA actuator.

* * * * *